United States Patent
Prevost et al.

(10) Patent No.: US 11,560,479 B2
(45) Date of Patent: Jan. 24, 2023

(54) BITUMEN/POLYMER COMPOSITION HAVING IMPROVED MECHANICAL PROPERTIES

(71) Applicant: TOTAL MARKETING SERVICES, Puteaux (FR)

(72) Inventors: Julie Prevost, Lyons (FR); Carole Ruot, Irigny (FR); Laurence Lapalu, Villeurbanne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 64 days.

(21) Appl. No.: 17/052,474

(22) PCT Filed: Apr. 30, 2019

(86) PCT No.: PCT/FR2019/051009
§ 371 (c)(1),
(2) Date: Nov. 2, 2020

(87) PCT Pub. No.: WO2019/211560
PCT Pub. Date: Nov. 7, 2019

(65) Prior Publication Data
US 2021/0047514 A1    Feb. 18, 2021

(30) Foreign Application Priority Data
May 2, 2018 (FR) ...................... 1853793

(51) Int. Cl.
*C08L 95/00*    (2006.01)
(52) U.S. Cl.
CPC ........... *C08L 95/00* (2013.01); *C08L 2555/84* (2013.01)
(58) Field of Classification Search
CPC .................................................... C08L 95/00
See application file for complete search history.

(56) References Cited

U.S. PATENT DOCUMENTS

2018/0244920 A1*  8/2018  Ruot ...................... C08L 95/00

FOREIGN PATENT DOCUMENTS

FR         3 050 510 A1    10/2017
WO    WO-2017046523 A1 *  3/2017 .............. C08L 95/00

OTHER PUBLICATIONS

English Machine Translation FR3050210 (A1) obtained at https://worldwide.espacenet.com/publicationDetails/biblio?CC=FR&NR=3050210A1&KC=A1&FT=D&ND=3&date=20171020&DB=EPODOC&locale=en_EP# (Year: 2017).*
Aug. 5, 2019 International Search Report issued in International Patent Application No. PCT/FR2019/051009.
Nov. 5, 2020 International Preliminary Reporton Patentability issued in International Patent Application No. PCT/FR2019/051009.

* cited by examiner

*Primary Examiner* — Arrie L Reuther
(74) *Attorney, Agent, or Firm* — Oliff PLC

(57) ABSTRACT

The invention relates to a bitumen/polymer composition containing at least one elastomer of the heat-crosslinkable S-B-S type, where S is a styrene or other vinylaromatic polymer block, and B is a polybutadiene block, the composition comprising an adjuvant of the olefin polymer type and having improved mechanical properties. The invention also relates to the use of the compositions in the fields of road applications such as hot mixes; warm mixes; cold mixes, for example cold-cast mixes or emulsion gravel; or surface dressings, for example fluxed bitumen or emulsions; and in the fields of industrial applications, for example in the production of inside and outside coatings.

18 Claims, No Drawings

BITUMEN/POLYMER COMPOSITION HAVING IMPROVED MECHANICAL PROPERTIES

TECHNICAL FIELD

The present invention belongs to the field of bitumens. More specifically, the invention relates to heat-crosslinkable bitumen/polymer compositions comprising an adjuvant of olefinic polymer type, these compositions having improved mechanical properties.

The invention also relates to the use of these compositions for road applications, notably for the preparation of mixes, such as hot mixes, warm mixes, cold mixes, such as, for example, cold-poured mixes or else grave emulsions; for the manufacture of surface coatings, for example fluxed bitumens or emulsions; but also for industrial applications, for example in the manufacture of interior and exterior coatings.

STATE OF THE PRIOR ART

Numerous studies have been carried out on improving the mechanical, elastic and/or rheological properties of bituminous compositions. Bitumen/polymer compositions exhibiting improved properties as well as their preparation method have been widely described in the literature.

Among the polymers added to bitumens, random or block copolymers of styrene and of a conjugated diene and, notably, of styrene and of butadiene or of styrene and of isoprene are known to be particularly effective because they mix very easily in bitumens and confer on them excellent mechanical properties and notably very good elastic properties.

These bitumen/polymer compositions are used for the preparation of binders for coatings of various surfaces and, in particular, as road surface coatings, provided that these compositions exhibit in combination a certain number of mechanical characteristics. Optimized mechanical characteristics, such as elastic properties, are notably crucial for applications in road surfacings.

Application FR 3 050 210 describes a method for the preparation of a bitumen/polymer composition exhibiting improved ductility before and after aging, this method comprising bringing into contact a bitumen base, an SBS-type elastomer and a sulfur-containing crosslinking agent.

Application WO97/43341 describes bitumen/polymer compositions containing a bitumen or a mixture of bitumens, from 0.3% to 20% by weight, with respect to the weight of bitumen, of at least one primary polymer chosen from certain elastomers and plastomers and from 0.01% to 12% by weight of at least one adjuvant of olefinic polymer type carrying epoxy or COOH groups. The polymers employed in this document are different from those of the invention. The role of the adjuvant is to prevent demixing between the bituminous phase and the polymer phase, which improves the storage stability of the composition.

Application WO2015/071370 describes bitumen/polymer compositions exhibiting improved cold mechanical properties and comprising:
a first bitumen base having an intrinsic stability S of greater than 2.5 and/or a peptization rate Sa of greater than 0.60,
a second bitumen base having an intrinsic stability S of less than or equal to 2.50 and/or a peptization rate Sa of less than or equal to 0.60,
an elastomer, and
an olefinic polymer adjuvant functionalized by at least glycidyl functional groups.
The compositions illustrated are crosslinked with sulfur and employ an SBS block terpolymer.

Application WO2008/137394 describes a process for preparing a bituminous binder composition modified by a polymer in the absence of crosslinking agents by heating a bitumen to a temperature of 160° C. to 221° C., adding a block copolymer composition and stirring to form a homogeneous mixture. The block copolymer compositions employed comprise one or more block copolymers having at least one monovinylaromatic block, at least one polybutadiene block having a vinyl content of less than 15 mol percent and at least one polybutadiene block having a vinyl content of more than 25 mol percent. It is taught that the bitumen/polymer compositions thus formulated have improved mechanical properties, such as ductility, and good storage stability.

Application WO2017/046523 discloses heat-crosslinkable bitumen/polymer compositions comprising an elastomer of S-B1-B2 type and an adjuvant of olefinic polymer type, S representing a styrene or other vinylaromatic polymeric block, B1 and B2 representing polybutadiene polymeric blocks. These compositions exhibit good mechanical properties and a satisfactory storage stability.

However, it has been unexpectedly discovered that it is possible to formulate heat-crosslinkable bitumen/polymer compositions exhibiting even better mechanical properties, notably in terms of tensile strength, while retaining a satisfactory storage stability.

The invention is targeted at developing a heat-crosslinkable additivated bitumen composition which is stable on storage and which exhibits improved elastic properties. The aim has been to find a system which is effective in all kinds of bitumens and which is not limited to an application to very specific bitumens. The aim has been to develop compositions exhibiting an improved tensile strength and a satisfactory storage stability.

SUMMARY OF THE INVENTION

The invention relates to a bitumen/polymer composition comprising:
bitumen,
at least one elastomer, and
at least one olefinic polymer adjuvant functionalized by at least one epoxy group,
characterized in that the elastomer is a heat-crosslinkable block copolymer of formula S-B-S, in which each S independently represents a block based on monovinylaromatic hydrocarbon monomers and B represents a block based on butadiene monomers, in which the S blocks represent, together, at least 15 mol % of the total number of moles of the heat-crosslinkable block copolymer, said heat-crosslinkable block copolymer has a weight-average molecular weight ranging from 40 000 to 500 000 g·mol$^{-1}$ and exhibits a content of vinyl groups of greater than or equal to 20 mol %, with respect to the total number of moles of the heat-crosslinkable block copolymer.

Another subject matter of the invention is a method for the preparation of a heat-crosslinked bitumen/polymer composition from a bitumen/polymer composition as defined above, and below for the preferred embodiments, characterized in that the following are brought into contact, the operation being carried out at temperatures ranging from 100° C. to 200° C.:
  bitumen,
  from 0.5% to 20% by weight of at least one elastomer,
  from 0.05% to 2.5% by weight of at least one olefinic polymer adjuvant functionalized by at least one epoxy group,
  optionally additives.

Another subject matter of the invention is a heat-crosslinked bitumen/polymer composition obtained by the method defined above and in detail below.

According to a preferred embodiment, the operation is carried out at a temperature ranging from 160° C. to 195° C., preferably from 160° C. to 180° C.

According to a preferred embodiment, each S represents a polystyrene block.

According to a preferred embodiment, the heat-crosslinkable block copolymer exhibits a content of vinyl groups of greater than or equal to 25 mol %, with respect to the total number of moles of the heat-crosslinkable block copolymer, preferably of greater than or equal to 28 mol %.

According to a preferred embodiment, the S blocks of the heat-crosslinkable block copolymer represent, together, from 15 mol % to 50 mol % of the total number of moles of the heat-crosslinkable block copolymer, preferably from 16 mol % to 30 mol %, more preferentially from 16 mol % to 25 mol % and more preferentially still from 16 mol % to 20 mol %.

According to a preferred embodiment, the composition comprises from 0.5% to 20% by weight of elastomer, with respect to the total weight of the composition, preferably from 0.5% to 15% by weight.

According to a preferred embodiment, the composition comprises from 0.05% to 2.5% by weight of olefinic polymer adjuvant functionalized by at least one epoxy group, with respect to the total weight of the composition, preferably from 0.15% to 2% by weight.

According to a preferred embodiment, the olefinic polymer adjuvant functionalized by at least one epoxy group is chosen from the group consisting of:
  (a) copolymers, preferably random, of ethylene and of a monomer chosen from glycidyl acrylate and glycidyl methacrylate, comprising from 50% to 99.7% by weight of ethylene;
  (b) terpolymers, preferably random, of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene; and
  (c) mixtures of at least two compounds (a) and (b).

According to an advantageous embodiment, the olefinic polymer adjuvant functionalized by at least one epoxy group is chosen from terpolymers, preferably random, of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene.

According to an even more advantageous embodiment, the olefinic polymer adjuvant functionalized by at least one epoxy group is chosen from random terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene.

According to an even more advantageous embodiment, the olefinic polymer adjuvant functionalized by at least one epoxy group is chosen from random terpolymers of ethylene, of a monomer A chosen from $C_1$ to $C_3$ alkyl acrylates or methacrylates and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene.

According to an even more advantageous embodiment, the olefinic polymer adjuvant functionalized by at least one epoxy group is chosen from random terpolymers of ethylene, of a monomer A chosen from ethyl acrylate and ethyl methacrylate and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene.

The invention also relates to an asphalt, characterized in that it comprises at least one heat-crosslinked bitumen/polymer composition as defined above and in detail below, and inorganic and/or synthetic fillers.

The invention also relates to an asphalt, characterized in that it consists essentially of at least one heat-crosslinked bitumen/polymer composition as defined above and in detail below, and inorganic and/or synthetic fillers.

The invention also relates to a bituminous mix, characterized in that it comprises at least one heat-crosslinked bitumen/polymer composition as defined above and in detail below, aggregates and optionally inorganic and/or synthetic fillers.

The invention also relates to a bituminous mix, characterized in that it consists essentially of at least one heat-crosslinked bitumen/polymer composition as defined above and in detail below, aggregates and optionally inorganic and/or synthetic fillers.

The invention also relates to the use of at least one bitumen/polymer composition or of at least one heat-crosslinked bitumen/polymer composition as defined above and in detail below, for preparing a surface coating, a hot mix, a warm mix, a cold mix, a cold-poured mix or a grave emulsion, said bitumen/polymer composition or heat-crosslinked bitumen/polymer composition being combined with aggregates and/or recycled milled products.

The invention also relates to the use of at least one bitumen/polymer composition or of at least one heat-crosslinked bitumen/polymer composition as defined above and in detail below, for preparing a leaktight coating, a membrane or a seal coat.

The compositions of the invention exhibit numerous advantages: they exhibit improved elastic properties, in particular a better cohesion, which is reflected notably by higher values of elongation at break and stress at maximum strain, as well as by higher values of energy at 400% elongation and of total energy. In particular, the compositions according to the invention exhibit an elongation at break at 5° C., measured according to the standard EN 13587, of greater than or equal to 500%, indeed even of greater than or equal to 600%, and an energy at 400% elongation of greater than 20 J/cm², preferably of greater than 23 J/cm². They also exhibit a satisfactory hot storage stability, in particular a storage stability at 180° C. of greater than or equal to 3 days, notably a storage stability at 180° C. characterized by a variation in penetrability at 25° C., measured according to the standard EN 1426, of less than or equal to 5¹⁄₁₀ mm, preferably of less than 2¹⁄₁₀ mm, and/or a ring and ball temperature variation, measured according to the standard EN 1427, of less than or equal to 5° C., preferably of less than 1° C. The combination of the elastomer and of the olefinic polymer adjuvant developed makes it possible to improve the mechanical properties, notably the elastic properties, of a wide range of bitumen compositions. This combination of the elastomer and of the olefinic polymer adjuvant also makes it possible to obtain bituminous compositions which are stable on storage.

DETAILED DESCRIPTION

The applicant company has discovered that the use of a specific elastomer in combination with a particular polymer adjuvant for the preparation of bitumen/polymer compositions makes it possible surprisingly to improve the mechanical properties, notably the elastic properties, in particular the elongation at break, of this bitumen/polymer composition while making it possible to obtain compositions which are stable on storage. This observation is not limited to a class of particular bitumens.

In addition, the bitumen/polymer composition of the invention exhibits the advantage of being economical compared to a bitumen/polymer composition based on the same SBS block copolymers and without adjuvant, in particular without olefinic polymer adjuvant functionalized by at least one epoxy group. This is because the addition of the olefinic polymer adjuvant functionalized by at least one epoxy group, in a small amount, makes it possible to significantly reduce the amount of block copolymer employed, with equivalent, indeed even superior, mechanical properties, and makes it possible to obtain a very satisfactory storage stability.

In the present invention, the expressions "bitumen/polymer composition" and "bitumen/polymer binder" represent one and the same type of composition and are employed interchangeably.

The expression "heat-crosslinked bitumen/polymer composition" denotes the composition resulting from the thermal crosslinking treatment of the mixture comprising at least the bitumen and the polymers.

The expression "consists essentially of", followed by one or more characteristics, means that, besides the components or stages explicitly listed, components or stages which do not significantly modify the properties and characteristics of the invention can be included in the method or the material of the invention.

The Bitumens

The invention relates to bitumens. These can be formed by one or more bitumen bases.

The term "bitumen" is understood to mean any bituminous composition composed of one or more bitumen bases and optionally comprising one or more chemical additives, said compositions being intended for a road application or an industrial application.

Mention may first of all be made, among the bitumen bases which can be used according to the invention, of bitumens of natural origin, those present in natural bitumen or natural asphalt deposits or bituminous sands and bitumens originating from the refining of crude oil. The bitumen bases according to the invention are advantageously chosen from bitumen bases originating from the refining of crude oil. The bitumen bases can be chosen from bitumen bases or mixtures of bitumen bases originating from the refining of crude oil, in particular bitumen bases containing asphaltenes or pitches. The bitumen bases can be obtained by conventional methods for the manufacture of bitumen bases in a refinery, in particular by direct distillation and/or vacuum distillation of oil. These bitumen bases can optionally be visbroken and/or deasphalted and/or air-rectified. It is common practice to carry out the vacuum distillation of the atmospheric residues originating from the atmospheric distillation of crude oil. This manufacturing method consequently corresponds to the sequence of an atmospheric distillation and of a vacuum distillation, the feedstock supplying the vacuum distillation corresponding to the atmospheric residues. These vacuum residues resulting from the vacuum distillation tower can also be used as bitumens. It is also common practice to inject air into a feedstock generally composed of distillates and of heavy products originating from the vacuum distillation of atmospheric residues originating from the distillation of oil. This method makes it possible to obtain a blown or semi-blown or oxidized or air-rectified or partially air-rectified base.

The various bitumen bases obtained by the refining methods can be combined together to obtain the best technical compromise. The bitumen base may also be a recycled bitumen base. The bitumen bases can be bitumen bases of hard grade or of soft grade.

According to the invention, for conventional processes for the manufacture of bitumen bases, the operation is carried out at manufacturing temperatures of between 100° C. and 200° C., preferably between 140° C. and 200° C., and with stirring for a period of time of at least 10 minutes, preferably of between 30 minutes and 10 hours, more preferentially between 1 hour and 6 hours. The term "manufacturing temperature" is understood to mean the temperature of heating of the bitumen base(s) before mixing and also the mixing temperature. The temperature and the duration of the heating vary according to the amount of bitumen used and are defined by the standard NF EN 12594.

According to the invention, blown bitumens can be manufactured in a blowing unit by passing a stream of air and/or oxygen through a starting bituminous base. This operation can be carried out in the presence of an oxidation catalyst, for example phosphoric acid. The blowing is generally carried out at high temperatures, of the order of 200 to 300° C., for relatively long time periods typically of between 30 minutes and 2 hours, continuously or in batches. The blowing duration and temperature are adjusted as a function of the properties targeted for the blown bitumen and as a function of the quality of the starting bitumen.

The bitumen can also be a recycled bitumen.

The bitumens can be bitumens of hard grade or of soft grade. The bitumens which can be used according to the invention have a penetrability, measured at 25° C. according to the standard EN 1426, of 5 to 330¹⁄₁₀ mm, preferably between 10 and 220¹⁄₁₀ mm, more preferentially from 10 to 120¹⁄₁₀ mm.

In a well-known way, the "needle penetrability" measurement is carried out by means of an NF EN 1426 standardized test at 25° C. ($P_{25}$). This characteristic of penetrability is expressed in tenths of a millimeter (dmm or 1/10 mm). The needle penetrability, measured at 25° C. according to the standardized test NF EN 1426, represents the measurement of the penetration into a bitumen sample, at the end of a time of 5 seconds, of a needle, the weight of which, with its support, is 100 g. The standard NF EN 1426 replaces the approved standard NF T 66-004 of December 1986 with effect from Dec. 20, 1999 (decision of the General Director of AFNOR dated Nov. 20, 1999).

Advantageously, the composition according to the invention comprises from 70% to 99.5% by weight of bitumen, preferably from 75% to 99% by weight, more preferably still from 80% to 98% by weight, with respect to the total weight of the bitumen/polymer composition.

The Olefinic Polymer Adjuvant Functionalized by at Least One Epoxy Group

The olefinic polymer adjuvant functionalized by at least one epoxy group is preferably chosen from the group consisting of (a) ethylene/glycidyl (meth)acrylate copolymers; (b) ethylene/monomer A/monomer B terpolymers and (c) the mixtures of these copolymers.

(a) The ethylene/glycidyl (meth)acrylate copolymers are advantageously chosen from copolymers, preferably random, of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from terpolymers, preferably random, of ethylene, of a monomer A and of a monomer B.

The monomer A is chosen from vinyl acetate and $C_1$ to $C_6$ alkyl acrylates or methacrylates, preferably chosen from $C_1$ to $C_6$, more preferentially still $C_1$-$C_3$, alkyl acrylates or methacrylates.

Advantageously, the monomer A is chosen from ethyl acrylate and ethyl methacrylate.

More advantageously still, the monomer A is ethyl acrylate.

The monomer B is chosen from glycidyl acrylate and glycidyl methacrylate.

Advantageously, the monomer B is glycidyl methacrylate.

The ethylene/monomer A/monomer B terpolymers comprise from 0.5% to 40% by weight, preferably from 5% to 35% by weight and more preferentially from 10% to 30% by weight of motifs resulting from the monomer A and from 0.5% to 15% by weight and preferably from 2.5% to 15% by weight of motifs resulting from the monomer B, the remainder being formed of motifs resulting from ethylene.

(c) The olefinic polymer adjuvant functionalized by at least one epoxy group can consist of a mixture of two or more copolymers chosen from the categories (a) and (b).

The olefinic polymer adjuvant functionalized by at least one epoxy group is preferably chosen from the ethylene/monomer A/monomer B terpolymers (b) described above and from the mixtures (c) comprising them.

The olefinic polymer adjuvant functionalized by at least one epoxy group is advantageously chosen from the ethylene/monomer A/monomer B terpolymers (b) described above and from the mixtures (c) in which the terpolymers (b) represent at least 50% by weight, with respect to the total weight of the mixture, preferentially at least 75% by weight, even better still at least 90% by weight.

Advantageously, the olefinic polymer adjuvant functionalized by at least one epoxy group is chosen from random terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferentially from 10% to 30% by weight, of motifs resulting from the monomer A and from 0.5% to 15% by weight, preferably from 2.5% to 15% by weight, of motifs resulting from the monomer B, the remainder being formed of motifs resulting from ethylene.

Preferably, the number-average molecular weight (Mn) of the olefinic polymer adjuvant functionalized by at least one epoxy group, determined by gel permeation chromatography with a polystyrene standard, ranges from 5000 to 50 000 g·mol$^{-1}$, more preferentially from 10 000 to 40 000 g·mol$^{-1}$ and more preferentially still from 25 000 to 40 000 g·mol$^{-1}$.

Preferably, the weight-average molecular weight (Mw) of the olefinic polymer adjuvant functionalized by at least one epoxy group, determined by gel permeation chromatography with a polystyrene standard, ranges from 10 000 to 250 000 g·mol$^{-1}$, more preferentially from 50 000 to 200 000 g·mol$^{-1}$ and more preferentially still from 10 000 to 150 000 g·mol$^{-1}$.

Advantageously, the number-average molecular weight (Mn) of the olefinic polymer adjuvant functionalized by at least one epoxy group, determined by triple detection gel permeation chromatography, is greater than or equal to 20 000 g·mol$^{-1}$, preferably greater than or equal to 30 000 g·mol$^{-1}$, more preferentially still greater than or equal to 40 000 g·mol$^{-1}$ and advantageously greater than or equal to 45 000 g·mol$^{-1}$.

More advantageously, the number-average molecular weight (Mn) of the olefinic polymer adjuvant functionalized by at least one epoxy group, determined by triple detection gel permeation chromatography, ranges from 20 000 to 200 000 g·mol$^{-1}$, preferably from 30 000 to 180 000 g·mol$^{-1}$, more preferentially still from 40 000 to 150 000 g·mol$^{-1}$ and advantageously from 45 000 to 120 000 g·mol$^{-1}$.

Advantageously, the weight-average molecular weight (Mw) of the olefinic polymer adjuvant functionalized by at least one epoxy group, determined by triple detection gel permeation chromatography, is greater than or equal to 60 000 g·mol$^{-1}$, preferably greater than or equal to 65 000 g·mol$^{-1}$, more preferentially still greater than or equal to 70 000 g·mol$^{-1}$ and advantageously greater than or equal to 75 000 g·mol$^{-1}$.

More advantageously, the weight-average molecular weight (Mw) of the olefinic polymer adjuvant functionalized by at least one epoxy group, determined by triple detection gel permeation chromatography, ranges from 60 000 to 200 000 g·mol$^{-1}$, preferably from 65 000 to 190 000 g·mol$^{-1}$, more preferentially still from 70 000 to 180 000 g·mol$^{-1}$ and advantageously from 75 000 to 170 000 g·mol$^{-1}$.

Advantageously, the polydispersity index of the olefinic polymer adjuvant functionalized by at least one glycidyl group, determined by triple detection gel permeation chromatography, is less than or equal to 3, preferably less than or equal to 2.5, more preferentially less than or equal to 2.0 and advantageously less than or equal to 1.8.

More advantageously, the polydispersity index of the olefinic polymer adjuvant functionalized by at least one glycidyl group, determined by triple detection gel permeation chromatography, ranges from 0.5 to 3.0, preferably from 0.8 to 2.5, more preferentially from 1.0 to 2.0 and advantageously from 1.2 to 1.8.

The term "monomer unit" is understood to mean, within the meaning of the invention, the largest constituent unit generated by the (co)polymerization of a single molecule of said monomer.

Advantageously, the olefinic polymer adjuvant functionalized by at least one glycidyl group comprises, on average, at least 500 ethylene units per macromolecule, preferably at least 800 ethylene units, more preferentially at least 1000 ethylene units, more preferentially still at least 1200 ethylene units and advantageously at least 1250 ethylene units.

More advantageously, the olefinic polymer adjuvant functionalized by at least one glycidyl group comprises, on average, from 500 to 10 000 ethylene units per macromolecule, preferably from 800 to 5000 ethylene units, more preferentially from 1000 to 4000 ethylene units, more preferentially still from 1200 to 3500 ethylene units and advantageously from 1250 to 3400 ethylene units.

Advantageously, the olefinic polymer adjuvant functionalized by at least one glycidyl group comprises, on average, at least 30 alkyl (meth)acrylate units per macromolecule, preferably at least 50 alkyl (meth)acrylate units, more preferentially at least 70 alkyl (meth)acrylate units, more preferentially still at least 90 alkyl (meth)acrylate units and advantageously at least 95 alkyl (meth)acrylate units.

More advantageously, the olefinic polymer adjuvant functionalized by at least one glycidyl group comprises, on average, from 30 to 500 alkyl (meth)acrylate units per macromolecule, preferably from 50 to 400 alkyl (meth)acrylate units, more preferentially from 70 to 300 alkyl (meth)acrylate units, more preferentially still from 90 to 250 alkyl (meth)acrylate units and advantageously from 95 to 200 alkyl (meth)acrylate units.

Advantageously, the olefinic polymer adjuvant functionalized by at least one glycidyl group comprises, on average, at least 15 glycidyl (meth)acrylate units per macromolecule, preferably at least 20 glycidyl (meth)acrylate units.

More advantageously, the olefinic polymer adjuvant functionalized by at least one glycidyl group comprises, on average, from 15 to 200 glycidyl (meth)acrylate units per macromolecule, preferably from 15 to 150 glycidyl (meth) acrylate units, more preferentially from 20 to 125 glycidyl (meth)acrylate units, more preferentially still from 20 to 100 glycidyl (meth)acrylate units and advantageously from 20 to 90 glycidyl (meth)acrylate units.

Preferably, the average mass of the ethylene units present in one mole of olefinic polymer adjuvant functionalized by at least one glycidyl group is greater than or equal to 15 000 g, more preferentially greater than or equal to 20 000 g, more preferentially still greater than or equal to 25 000 g, advantageously greater than or equal to 30 000 g and more advantageously greater than or equal to 35 000 g.

More preferentially, the average mass of the ethylene units present in one mole of olefinic polymer adjuvant functionalized by at least one glycidyl group ranges from 15 000 to 200 000 g, more preferentially from 20 000 to 150 000 g, more preferentially still from 25 000 to 100 000 g, advantageously from 30 000 to 90 000 g and more advantageously from 35 000 to 88 000 g.

Preferably, the average mass of the alkyl (meth)acrylate units present in one mole of olefinic polymer adjuvant functionalized by at least one glycidyl group is greater than or equal to 3500 g, more preferentially greater than or equal to 5000 g, more preferentially still greater than or equal to 7500 g and advantageously greater than or equal to 9500 g.

More preferentially, the average mass of the alkyl (meth) acrylate units present in one mole of olefinic polymer adjuvant functionalized by at least one glycidyl group ranges from 3500 to 50 000 g, more preferentially from 5000 to 25 000 g, more preferentially still from 7500 to 20 000 g and advantageously from 9500 to 19 000 g.

Preferably, the average mass of the glycidyl (meth)acrylate units present in one mole of olefinic polymer adjuvant functionalized by at least one glycidyl group is greater than or equal to 1500 g, more preferentially greater than or equal to 2000 g, more preferentially still greater than or equal to 2500 g, advantageously greater than or equal to 2750 g and more advantageously greater than or equal to 2900 g.

More preferentially, the average mass of the glycidyl (meth)acrylate units present in one mole of olefinic polymer adjuvant functionalized by at least one glycidyl group ranges from 1500 to 20 000 g, more preferentially from 2000 to 17 500 g, more preferentially still from 2500 to 15 000 g, advantageously from 2750 to 12 500 g and more advantageously from 2900 to 12 000 g.

The content of olefinic polymer adjuvant functionalized by at least one epoxy group in the bitumen/polymer composition according to the invention is preferably from 0.05% to 2.5% by weight, with respect to the total weight of the composition, more preferentially from 0.15% to 2% by weight, more preferentially still from 0.2% to 1% by weight, more preferentially still from 0.4% to 1% by weight, more preferentially still from 0.4% to 0.8% by weight.

The Elastomer

The elastomer is advantageously a block copolymer or a mixture of block copolymers.

Preferably, the block copolymer comprises at least 3 consecutive blocks.

It is preferably chosen from heat-crosslinkable block copolymers of formula S-B-S, in which each S independently represents a block based on monovinylaromatic hydrocarbon monomers and B represents a block based on butadiene monomers, in which the S blocks represent, together, at least 15 mol % of the total number of moles of the heat-crosslinkable block copolymer, said heat-crosslinkable block copolymers have a weight-average molecular weight ranging from 40 000 to 500 000 g·mol$^{-1}$ and exhibit a content of vinyl groups of greater than or equal to 20 mol %, with respect to the total number of moles of the heat-crosslinkable block copolymer.

The term "block" is understood to mean, within the meaning of the invention, a polymeric chain obtained by the polymerization of one or more monomers of the same chemical nature.

The monovinylaromatic hydrocarbon monomers from which the S blocks of the heat-crosslinkable block copolymers defined above derive can independently be any monovinylaromatic hydrocarbon compound known for use in the preparation of block copolymers, such as: styrene, o-methylstyrene, p-methylstyrene, p-(tert-butyl)styrene, 2,4-dimethylstyrene, α-methylstyrene, vinylnaphthalene, vinyltoluene and vinylxylene or their mixtures. The preferred monovinylaromatic hydrocarbon compound according to the present invention is styrene, which is used as a substantially pure monomer or as the predominant component in mixtures with minor proportions of another vinylaromatic monomer of related structure, such as o-methylstyrene, p-methylstyrene, p-(tert-butyl)styrene, 2,4-dimethylstyrene, α-methylstyrene, vinylnaphthalene, vinyltoluene and vinylxylene, namely in proportions of not more than 10% by weight. The use of substantially pure styrene is particularly preferred in the present invention.

The block based on butadiene monomers B participating in the composition of the block copolymers mentioned above is based on butadiene monomers which are virtually pure or which comprise minor proportions, up to 10% by weight, of structurally related conjugated dienes. Preferably, the polybutadiene is formed purely from butadiene monomers.

As regards the block copolymers of the present invention, the terms "molecular weight" or "average molar mass" are expressed in g·mol$^{-1}$. The molecular weights mentioned in the description and the claims can be measured by gel permeation chromatography (GPC) (or SEC for size exclusion chromatography). GPC is a liquid chromatography method in which polymers are separated according to their hydrodynamic volume, which is then converted into weight-average molecular weight (Mw) and/or into number-average molecular weight (Mn). GPC can be conventional or triple detection according to the conversion method used.

In the context of conventional GPC, the hydrodynamic volume is converted by means of an external calibration. The standards used are generally linear polymethyl methacrylate or polystyrene standards. In the case of the block copolymers of the present invention, the molecular weights are measured according to a polystyrene calibration. The molecular weight of the polymers measured by GPC is thus a molecular weight in styrene equivalents. The detector used is preferably a combination of a UV (ultraviolet) detector and of an RI (difference in refractive indices) detector.

In triple detection GPC, the system is equipped with 3 detectors: an RI detector, a light scattering detector and a viscosity detector (viscosimeter). The values of molecular weights are obtained directly (without requiring a calibration curve) by processing the results obtained from each of the detectors. The heat-crosslinkable block copolymer of formula S-B-S used in the present invention exhibits a weight-average molecular weight Mw, measured by gel permeation chromatography with a polystyrene standard, ranging from 40 000 to 500 000 g·mol$^{-1}$.

Preferably, the heat-crosslinkable block copolymer of formula S-B-S used in the present invention exhibits a weight-average molecular weight Mw, measured by gel permeation chromatography with a polystyrene standard, of less than or equal to 400 000 g·mol$^{-1}$, more preferentially of less than or equal to 250 000 g·mol$^{-1}$, more preferentially still of less than or equal to 200 000 g·mol$^{-1}$ and advantageously of less than or equal to 150 000 g·mol$^{-1}$.

Preferably, the heat-crosslinkable block copolymer of formula S-B-S used in the present invention exhibits a weight-average molecular weight Mw, measured by gel permeation chromatography with a polystyrene standard, of greater than or equal to 50 000 g·mol$^{-1}$, more preferentially of greater than or equal to 65 000 g·mol$^{-1}$, more preferentially still of greater than or equal to 75 000 g·mol$^{-1}$ and advantageously of greater than or equal to 100 000 g·mol$^{-1}$.

When 1,3-butadiene is polymerized via a 1,2-addition mechanism, the result is a vinyl group pendant with respect to the backbone of the polymer. As indicated above, the heat-crosslinkable block copolymer of formula S-B-S used in the present invention exhibits a content of vinyl groups of greater than or equal to 20 mol %, with respect to the total number of moles of copolymer. This vinyl content, determined by coupling of the $^{13}$C NMR (carbon nuclear magnetic resonance) and $^{1}$H NMR (proton nuclear magnetic resonance) spectroscopy techniques, makes it possible to characterize the polymer.

The heat-crosslinkable block copolymer of formula S-B-S used in the present invention preferably exhibits a content of vinyl groups of greater than or equal to 25 mol %, with respect to the total number of moles of S-B-S copolymer, more preferentially of greater than or equal to 28 mol %.

The heat-crosslinkable block copolymer of formula S-B-S used in the present invention preferably exhibits a content of vinyl groups of less than or equal to 50 mol %, with respect to the total number of moles of S-B-S copolymer, more preferentially of less than or equal to 40 mol % and more preferentially still of less than or equal to 35 mol %.

The heat-crosslinkable block copolymer of formula S-B-S used in the present invention preferably exhibits a content of vinyl groups of greater than or equal to 15% by weight, with respect to the total weight of the copolymer, more preferentially of greater than or equal to 20% by weight and more preferentially still of greater than or equal to 25% by weight.

The heat-crosslinkable block copolymer of formula S-B-S used in the present invention preferably exhibits a content of vinyl groups of less than or equal to 50% by weight, with respect to the total weight of the copolymer, more preferentially of less than or equal to 40% by weight and more preferentially still of less than or equal to 30% by weight.

The vinyl content in the block B is preferably greater than or equal to 25% by weight, with respect to the total weight of the condensed polybutadiene motifs present in the block B, more preferentially greater than or equal to 30% by weight, more preferentially still greater than or equal to 35% by weight.

The vinyl content in the block B is preferably less than or equal to 50% by weight, with respect to the total weight of the condensed polybutadiene motifs present in the block B, more preferentially less than or equal to 45% by weight, more preferentially still less than or equal to 40% by weight.

The motifs obtained by the polymerization of 1,3-butadiene according to a 1,2-addition mechanism or according to a 1,4-addition mechanism exhibit the same molar mass. Thus, the contents of vinyl groups present in the block B, expressed by weight or in moles, are equivalent.

Preferably, the vinyl groups are distributed along the block B in a random manner. This characteristic results directly from the process employed for the synthesis of the copolymer.

The S blocks present in the heat-crosslinkable block copolymer of formula S-B-S together represent at least 15 mol %, with respect to the total number of moles of heat-crosslinkable block copolymer of formula S-B-S, preferably at least 16 mol %.

Preferably, the blocks S represent, together, from 15 mol % to 50 mol %, with respect to the total amount of moles of heat-crosslinkable block copolymer of formula S-B-S, more preferentially from 16 mol % to 30 mol %, more preferentially still from 16 mol % to 25 mol %, and advantageously from 16 mol % to 20 mol %.

Preferably, the content of monovinylaromatic hydrocarbon (advantageously styrene) of the heat-crosslinkable block copolymer of formula S-B-S, determined by $^{13}$C NMR (carbon Nuclear Magnetic Resonance) spectroscopy, is greater than or equal to 25% by weight, more preferentially greater than or equal to 28% by weight, more preferentially still greater than or equal to 30% by weight, with respect to the total weight of the heat-crosslinkable block copolymer of formula S-B-S.

Preferably, the content of monovinylaromatic hydrocarbon (advantageously styrene) of the heat-crosslinkable block copolymer of formula S-B-S, determined by $^{13}$C NMR (carbon Nuclear Magnetic Resonance) spectroscopy, ranges from 25% to 40% by weight, more advantageously still from 28% to 35% by weight, with respect to the total weight of the heat-crosslinkable block copolymer of formula S-B-S.

According to a first alternative form, the elastomer is essentially composed of one or more heat-crosslinkable block copolymer(s) of formula S-B-S.

According to a preferred alternative form, the heat-crosslinkable block copolymer(s) of formula S-B-S are used in combination with one or more block copolymer(s) of formula S-B in which S is a block based on monovinylaromatic hydrocarbon monomers, preferably based on styrene, and B is a block based on butadiene monomers.

Preferably, according to this preferred alternative form, the mixture of copolymers is predominantly composed of the heat-crosslinkable block copolymer(s) of formula S-B-S.

More preferentially still, still according to this preferred alternative form, the S-B-S/S-B ratio by weight ranges from 99.5:0.5 to 80:20 by weight, more preferentially from 99.5:0.5 to 90:10 by weight.

Advantageously, the block copolymers of the invention are in an essentially nonhydrogenated form.

According to a particular embodiment, the heat-crosslinkable block copolymer of formula S-B-S is obtained by coupling two block copolymers of formula S-B in which the S and B blocks are as described above in the definition of the heat-crosslinkable block copolymer of formula S-B-S.

Preferably, according to this particular embodiment, the effectiveness of the coupling of the elastomer, measured by gel permeation chromatography, is greater than or equal to 50%, more preferentially greater than or equal to 75%, more preferentially still greater than or equal to 90% and advantageously greater than or equal to 95%.

Examples of heat-crosslinkable block copolymers of formula S-B-S which can be used in the compositions according to the invention, as well as their preparation methods, are notably described in U.S. Pat. No. 5,798,401.

The composition can comprise other elastomers than the heat-crosslinkable block terpolymers of formula S-B-S and the block copolymers of formula S-B.

Notably, the composition according to the invention can contain other known elastomers for bitumen, such as S-B1-B2 (styrene-butadiene-butadiene block copolymer in which the two butadiene blocks B1 and B2 exhibit a different vinyl content), SIS (styrene-isoprene-styrene), SBS* (star-branched styrene-butadiene-styrene block copolymer), SBR (styrene-butadiene rubber), EPDM (modified ethylene-propylene-diene), polychloroprene, polynorbornene, natural rubber, recycled rubber, polybutene, polyisobutylene or SEBS (copolymer of styrene, ethylene, butylene and styrene) copolymers. Mention may also be made of elastomers prepared from styrene monomers and from butadiene monomers making possible crosslinking without a crosslinking agent, such as described in the document WO2007/058994 and by the applicant company in the patent application WO2011/013073.

Advantageously, the heat-crosslinkable block copolymers of formula S-B-S and the block copolymers of formula S-B which have been defined above represent, together, at least 50% by weight of the elastomers present in the composition, more preferentially at least 70% by weight and more preferentially still at least 90% by weight.

According to a preferred alternative form of the invention, the elastomer consists essentially of heat-crosslinkable block copolymers of formula S-B-S and of block copolymers of formula S-B.

The composition can also additionally comprise other plastomers distinct from the olefinic polymer adjuvant functionalized by at least one epoxy group.

Notably, the composition according to the invention can also additionally contain one or more polymeric components chosen from the category of known thermoplastics and plastomers for bitumen.

Mention may notably be made, by way of example of thermoplastics, of polyethylenes, such as PE (polyethylene) or HDPE (high density polyethylene), and polypropylene PP.

Mention may be made, by way of example of plastomers, of EVA (ethylene-vinyl acetate copolymer), EMA (ethylene-methyl acrylate copolymer), copolymers of olefins and of unsaturated carboxylic esters, EBA (ethylene-butyl acrylate copolymer), copolymers of ethylene and of esters of acrylic or methacrylic acid or of maleic anhydride, ethylene-propylene copolymers and ABSs (acrylonitrile-butadiene-styrene).

Advantageously, when the composition according to the invention comprises at least one plastomer and/or at least one thermoplastic as defined above, the heat-crosslinkable block copolymers of formula S-B-S and the block copolymers of formula S-B represent, together, at least 50% by weight, with respect to the total weight of all of the heat-crosslinkable block copolymers of formula S-B-S, of the block copolymers of formula S-B, of the thermoplastics and of the plastomers distinct from the olefinic polymer adjuvant functionalized by at least one epoxy group present in the composition, more preferentially still at least 70% by weight.

According to an alternative form of the invention, the composition can comprise, in addition to the heat-crosslinkable block copolymers of formula S-B-S and the copolymers of formula S-B, at least one other elastomer as defined above and at least one plastomer as defined above.

Advantageously, when the composition according to the invention additionally comprises at least one other elastomer as defined above and at least one plastomer as defined above, the heat-crosslinkable block copolymers of formula S-B-S and the block copolymers of formula S-B represent at least 50% by weight, with respect to the total weight of all of the heat-crosslinkable block copolymers of formula S-B-S, of the block copolymers of formula S-B, of the other elastomers and of the plastomers distinct from the olefinic polymer adjuvant functionalized by at least one epoxy group present in the composition, more preferentially still at least 70% by weight.

The content of elastomers in the bitumen/polymer composition according to the invention is preferably from 0.5% to 20% by weight, with respect to the total weight of the bitumen/polymer composition, more preferentially from 0.5% to 15% by weight, more preferentially still from 1% to 5% by weight, more preferentially still from 2% to 4% by weight.

Other Additives

It is also possible to add, to the bitumen/polymer composition of the invention, in a known way:
  a) adhesion agents and/or surface-active agents. They are generally chosen from alkylamine derivatives, alkylpolyamine derivatives, alkylamidopolyamine derivatives and derivatives of quaternary ammonium salts, taken alone or as a mixture. The amount of adhesion agents and/or of surface-active agents in the bitumen/polymer composition is, for example, between 0.2% and 2% by weight, preferably between 0.5% and 1% by weight, with respect to the total weight of the bitumen/polymer composition.

b) waxes of animal or vegetable origin or hydrocarbon waxes, in particular long-chain hydrocarbon waxes, for example polyethylene waxes or paraffins, which are optionally oxidized. Amide waxes, such as ethylene bis(stearamide), can also be added.

c) paraffins exhibiting chain lengths of 30 to 120 carbon atoms ($C_{30}$ to $C_{120}$). The paraffins are chosen from polyalkylenes. Preferably, the paraffins are polymethylene paraffins and polyethylene paraffins. These paraffins can be of petroleum origin or can originate from the chemical industry. Preferably, the paraffins are synthetic paraffins resulting from the conversion of biomass and/or natural gas.

These paraffins can also contain a large proportion of "normal" paraffins, that is to say paraffins which are linear having a straight chain, which are unbranched (saturated hydrocarbons). Thus, the paraffins can comprise from 50% to 100% of normal paraffins and from 0% to 50% of isoparaffins and/or of branched paraffins. Preferentially, the paraffins comprise from 85% to 95% of normal paraffins and from 5% to 15% of isoparaffins and/or of branched paraffins. More preferentially, the paraffins comprise from 50% to 100% of normal paraffins and from 0% to 50% of isoparaffins. Preferentially, the paraffins comprise from 85% to 95% of normal paraffins and from 5% to 15% of isoparaffins.

Advantageously, the paraffins are polymethylene paraffins. More particularly, the paraffins are synthetic polymethylene paraffins, notably paraffins resulting from the conversion of synthesis gas by the Fischer-Tropsch process. In the Fischer-Tropsch process, paraffins are obtained by reaction of hydrogen with carbon monoxide over a metal catalyst. Fischer-Tropsch synthesis processes are described, for example, in the publications EP 1 432 778, EP 1 328 607 and EP 0 199 475.

Preferably, the paraffins are Fischer-Tropsch polymethylene paraffins sold by Sasol, in particular under the brand name Sasobit®.

d) fluxes, such as oils based on animal and/or vegetable fatty substances or hydrocarbon oils of petroleum origin. The oils of animal and/or vegetable origin can be in the form of free fatty acids, of triglycerides, of diglycerides, of monoglycerides or in the esterified form, for example in the methyl ester form.

e) resins of vegetable origin, such as rosins.

f) antifoam additives, notably (but nonlimitingly) chosen from polysiloxanes, oxyalkylated polysiloxanes and amides of fatty acids resulting from vegetable or animal oils.

g) detergent additives and/or corrosion inhibitors, notably (but nonlimitingly) chosen from the group consisting of amines, succinimides, alkenylsuccinimides, polyalkylamines, polyalkylpolyamines, polyetheramines and imidazolines.

h) slip agents or antiwear agents, notably (but nonlimitingly) chosen from the group consisting of fatty acids and their ester or amide derivatives, notably glyceryl monooleate, and derivatives of mono- and polycyclic carboxylic acids.

i) crystallization-modifying additives, additives which inhibit paraffin deposits, additives which make it possible to lower the pour point; modifiers of the rheology at low temperature, such as ethylene/vinyl acetate (EVA) and/or ethylene/vinyl propionate (EVP) copolymers, ethylene/vinyl acetate/vinyl versatate (EA/AA/EOVA) terpolymers; ethylene/vinyl acetate/alkyl acrylate terpolymers; EVA copolymers modified by grafting; polyacrylates; acrylates/vinyl acetate/maleic anhydride terpolymers; amidated maleic anhydride/alkyl (meth)acrylate copolymers capable of being obtained by reaction of a maleic anhydride/alkyl (meth) acrylate copolymer and of an alkylamine or polyalkylamine having a hydrocarbon chain of 4 to 30 carbon atoms, preferably of 12 to 24 carbon atoms; amidated α-olefin/maleic anhydride copolymers capable of being obtained by reaction of an α-olefin/maleic anhydride copolymer and of an alkylamine or polyalkylamine, it being possible for the α-olefin to be chosen from $C_{10}$-$C_{50}$ α-olefins, preferably $C_{16}$-$C_{20}$ α-olefins, and the alkylamine or the polyalkylamine advantageously having a hydrocarbon chain of 4 to 30 carbon atoms, preferably of 12 to 24 carbon atoms.

j) antioxidants, for example of hindered phenolic type or of amino type, of alkylated para-phenylenediamine type.

k) metal passivators.

l) acidity neutralizers.

m) additives which make it possible to lower the temperature of mixing of the asphalts and mixes, those making it possible to improve the adhesion of bituminous binders to the fillers and aggregates, such as, for example, polyisobutylenesuccinimides.

n) acids, such as polyphosphoric acid, or diacids, in particular fatty diacids.

The additives are employed following the amounts well known to a person skilled in the art, depending on the nature of the additive, depending on the bitumen base and on the expected properties.

When it comprises one or more additives, the bitumen base comprises from 0.1% to 10% by weight, preferably from 0.5% to 5% by weight, more preferentially from 0.5% to 2.5% by weight, of chemical additive, with respect to the total weight of the bitumen base.

The Composition

The invention relates to the composition resulting from the simple mixing of its components and to the heat-crosslinked composition resulting from the heat treatment of this composition. The heat treatment is described below in the section entitled "The preparation method". The percentages described below relate to the mixture of the components and are found again in the heat-crosslinked composition.

Advantageously, the bitumen/polymer composition is devoid of sulfur-containing crosslinking agent. In particular, the bitumen/polymer composition comprises less than 6 ppm of sulfur-containing crosslinking agent.

Preferably, the bitumen/polymer composition consists essentially:
of bitumen,
of one or more elastomer(s) as defined above,
of one or more olefinic polymer adjuvant(s) as defined above, and
optionally, of one or more additives as defined above.

Advantageously, the bitumen/polymer composition comprises:
bitumen,
from 0.5% to 20% by weight of at least one elastomer as defined above,
from 0.05% to 2.5% by weight of at least one olefinic polymer adjuvant as defined above, from 0% to 5% of additives.

More advantageously still, the bitumen/polymer composition comprises:
bitumen,
from 0.5% to 15% by weight of at least one elastomer as defined above,
from 0.15% to 2% by weight of at least one olefinic polymer adjuvant as defined above,
from 0% to 5% of additives.

Advantageously, the bitumen/polymer composition consists essentially of:
bitumen,
from 0.5% to 20% by weight of at least one elastomer as defined above,
from 0.05% to 2.5% by weight of at least one olefinic polymer adjuvant as defined above,
from 0% to 5% of additives.

More advantageously, the bitumen/polymer composition consists essentially of:
from 72.5% to 99.45% of bitumen,
from 0.5% to 20% by weight of at least one elastomer as defined above,
from 0.05% to 2.5% by weight of at least one olefinic polymer adjuvant as defined above,
from 0% to 5% of additives.

More preferably, the bitumen/polymer composition consists essentially of:
bitumen,
from 0.5% to 15% by weight of at least one elastomer as defined above,
from 0.15% to 2% by weight of at least one olefinic polymer adjuvant as defined above,
from 0% to 5% of additives.

More preferably still, the bitumen/polymer composition consists essentially of:
from 78% to 99.45% of bitumen,
from 0.5% to 15% by weight of at least one elastomer as defined above,
from 0.15% to 2% by weight of at least one olefinic polymer adjuvant as defined above,
from 0% to 5% of additives.

The percentages by weight are calculated with respect to the total weight of said composition.

According to the invention, the elastomer/olefinic polymer adjuvant ratio by weight is advantageously from 15/1 to 2/1, preferably from 12/1 to 5/2.

Preferably, the heat-crosslinked composition is obtained directly by heat treatment of the bitumen/polymer composition defined above, the heat treatment inducing the crosslinking of the bitumen/polymer composition.

Preferably, the crosslinking is essentially thermal.

The term "essentially thermal crosslinking" is understood to mean, within the meaning of the invention, a crosslinking created by heat treatment, in the absence of a chemical crosslinking agent. A composition obtained by such a method thus differs from the compositions obtained by crosslinking in the presence of crosslinking agents, notably crosslinking agents chosen from sulfur-containing crosslinking agents.

The Manufacturing Method

The bitumen/polymer compositions of the invention can be prepared by any method known to a person skilled in the art. As a general rule, these methods comprise the mixing of the components and the heating of the mixture. The bitumen can be heated before mixing. Usually, the bitumen is heated before mixing, and the other components are added to the bitumen without having been preheated.

According to a particular embodiment of the invention, a bitumen/polymer composition is prepared by bringing into contact:
bitumen,
from 0.5% to 20% by weight, preferably from 0.5% to 15% by weight, of at least one elastomer as defined above,
from 0.05% to 2.5% by weight, preferably from 0.15% to 2% by weight, of at least one olefinic polymer adjuvant functionalized by at least one epoxy group,
optionally additives.

The percentages by weight are calculated with respect to the total weight of said composition.

According to one embodiment of the invention, the operation is carried out at temperatures ranging from 100° C. to 200° C., preferably from 150° C. to 200° C., preferentially from 160° C. to 200° C., more preferably from 160° C. to 195° C., more preferably still from 160° C. to 180° C. This embodiment thus makes possible the preparation of a heat-crosslinked bitumen/polymer composition.

The operation is preferably carried out with stirring, advantageously for a period of time of at least 10 minutes, preferably of from 1 hour to 24 hours, more preferentially from 1 hour to 10 hours.

The method of the invention can be carried out by means of stirring producing high shear or stirring producing low shear. The method of the invention can comprise successive sequences with different stirring modes; for example, the method of the invention can comprise at least two successive stirring sequences, a first sequence producing high-shear stirring, followed by a second sequence producing low-shear stirring, preferably ranging from 400 revolutions/min to 1000 revolutions/min.

According to a preferred embodiment, the method for the manufacture of the heat-crosslinked bitumen/polymer composition comprises, for example, the following successive stages:
i) the bitumen, the heat-crosslinkable elastomer and the olefinic polymer adjuvant functionalized by at least one epoxy group, and optionally the additives, are introduced into a reactor,
ii) the mixture is stirred until a homogeneous mixture is obtained and heated at a temperature ranging from 100° C. to 200° C., preferably from 150° C. to 200° C., preferentially from 160° C. to 200° C., more preferably from 160° C. to 195° C., more preferably still from 160° C. to 180° C.

The mixing of stage ii) is preferably carried out for a period of time of at least 10 minutes, preferably from 1 hour to 24 hours, more preferentially from 1 hour to 10 hours.

In the implementation described above, the olefinic polymer adjuvant functionalized by at least one epoxy group can be incorporated in the bitumen before or after the heat-crosslinkable elastomer, it also being possible to envisage a simultaneous incorporation.

In particular, the olefinic polymer adjuvant functionalized by at least one epoxy group is incorporated in the bitumen before or after the elastomer.

Also in particular, the olefinic polymer adjuvant functionalized by at least one epoxy group and the elastomer are incorporated at the same time in the bitumen.

According to another preferred embodiment, the method for the manufacture of the heat-crosslinked bitumen/polymer composition comprises, for example, the following successive stages:

i) the bitumen, preheated to a temperature ranging from 100° C. to 200° C., the heat-crosslinkable elastomer and the olefinic polymer adjuvant functionalized by at least one epoxy group, and optionally the additives, are introduced into a reactor,
ii) the mixture is homogenized by passing through a mill at high shear, preferably between 1000 and 6000 revolutions/min, preferably for a period of time of at least 1 minute, more preferentially ranging from 1 min to 2 hours, more preferentially still from 1 min to 30 min,
iii) the mixture obtained in stage ii) is subsequently transferred into a maturing tank, preferably for a period of time of at least 30 min, more preferentially from 30 min to 24 hours, more preferentially still from 1 hour to 10 hours, before it is stored or used.

The maturing stage iii) described above is preferably carried out at a temperature ranging from 100° C. to 200° C., more preferentially ranging from 150° C. to 200° C., more preferentially still ranging from 160° C. to 200° C., advantageously from 160° C. to 195° C. and more advantageously still from 160° C. to 180° C.

Preferably, the stirring at high shear, and notably the stirring carried out by passing through a mill at high shear, makes it possible to facilitate the good dispersion and the good distribution of the polymer and of the olefinic polymer adjuvant.

Use of the Bitumen/polymer Compositions According to the Invention

Various uses of the bitumen/polymer compositions obtained according to the invention are envisaged. In particular, the bitumen/polymer compositions can be used for the preparation of a bitumen/polymer binder. The bitumen/polymer binder according to the invention can be employed in combination with aggregates, in particular road aggregates.

As regards the road applications, the invention is targeted notably at bituminous mixes as materials for the construction and maintenance of road foundations and their surfacing, and also for carrying out all road works.

The term "bituminous mix" is understood to mean a mixture of a bituminous binder with aggregates and optionally inorganic and/or synthetic fillers.

The bituminous mix comprises a bitumen/polymer binder according to the invention, and optionally inorganic and/or synthetic fillers, preferably chosen from fines, sand, gravel and recycled milled products. The aggregates are inorganic and/or synthetic aggregates, notably recycled milled products, with dimensions of greater than 2 mm, preferably of between 2 mm and 20 mm.

The bitumen/polymer binder according to the invention can advantageously be used to prepare a surface coating, a hot mix, a warm mix, a cold mix, a cold-poured mix or a grave emulsion.

As regards the road applications, the invention is also targeted at asphalts as materials for manufacturing and covering sidewalks.

The term "asphalt" is understood to mean a mixture of bituminous binder with inorganic and/or synthetic fillers.

An asphalt comprises a bitumen/polymer binder according to the invention and inorganic fillers, such as fines, sand or gravel, and/or synthetic fillers. The inorganic fillers consist of fines (particles with dimensions of less than 0.063 mm), of sand (particles with dimensions of between 0.063 mm and 2 mm) and optionally of gravel (particles with dimensions of greater than 2 mm, preferably of between 2 mm and 4 mm).

Asphalts exhibit a compactness of 100% and are mainly used to make and cover sidewalks, while mixes have a compactness of less than 100% and are used to make roads. Unlike mixes, asphalts are not compacted with a roller during their placement.

Another aspect of the invention is the use of a bitumen/polymer composition in various industrial applications, notably for preparing a leaktight coating, a membrane or a seal coat.

As regards the industrial applications of the bituminous compositions according to the invention, mention may be made of the manufacture of leaktight membranes, of noise-reduction membranes, of insulating membranes, of surface coatings, of carpet tiles or of seal coats.

Another subject matter of the invention is the use of bitumen/polymer binders, of mixes and of poured asphalts according to the invention in the manufacture of surfacings of roads, of pavements, of sidewalks, of highways, of urban developments, of ground surfaces, of leaktightness of buildings or of works, in particular in the manufacture in the application to roads of foundation courses, base courses, bedding courses, surface courses, such as binder courses and/or wearing courses.

Another subject matter of the invention is the use of at least one elastomer and of at least one olefinic polymer adjuvant functionalized by at least one epoxy group as are defined above to improve the mechanical properties of a bitumen or of a bituminous composition, notably the elastic properties.

In particular, a subject matter of the invention is the use of at least one elastomer and of at least one olefinic polymer adjuvant functionalized by at least one epoxy group as are defined above to increase the value of the elongation at break and/or of the total energy of a bitumen or of a bituminous composition.

Another subject matter of the invention is a method for improving the mechanical properties, notably the elastic properties, of a bitumen or of a bituminous composition, said method comprising the introduction, into said bitumen or said bituminous composition, of at least one elastomer and of at least one olefinic polymer adjuvant functionalized by at least one epoxy group as are defined above.

In particular, the invention relates to a method which makes it possible to increase the value of the elongation at break and/or of the total energy of a bitumen or of a bituminous composition, said method comprising the introduction, into said bitumen or said bituminous composition, of at least one elastomer and of at least one olefinic polymer adjuvant functionalized by at least one epoxy group as are defined above.

Experimental Section

A—Materials and Methods

The properties of the bitumens are measured by means of the methods described below:
Needle penetrability at 25° C. (P25): unit=1/10 mm, standard EN 1426.
Ring and ball softening point (RBSP): unit=° C., standard EN 1427.
Elastic recovery at 25° C. (R25): unit=%, standard EN 13398.
Tensile test at 5° C., 100 mm/min, standard EN 13587:

Energy at 400%, unit: J/cm$^2$,

Total energy, unit: J,

ε max: maximum elongation at break, unit: %, and

σ ε max: stress at maximum strain, unit: MPa.

The elongation tests on the bitumen/polymer compositions described below were carried out up to a maximum elongation equal to 700%, whether or not breaking of the sample took place. A value of the maximum elongation at break of greater than 700% thus indicates that the test was interrupted before breaking of the sample.

Stability: the storage stability is evaluated by measuring the difference in penetrability (ΔPene) and the difference in RBSP (ΔRBSP) after 3 days of storage at 180° C.

Starting Substances

Bitumen base (B): use was made of a bitumen base of 35/50 grade having a penetrability P$_{25}$ of 53¹/₁₀ mm and an RBSP of 51.8° C. and available commercially from the Total group under the brand name Azalt®.

The Olefinic Polymer Adjuvants (Adj):

Adjuvant A1: Ethylene/butyl acrylate/glycidyl methacrylate terpolymer in proportions by weight, determined by $^1$H NMR (proton nuclear magnetic resonance) spectroscopy, respectively of 70/21/9 and having a melt flow rate (MFR) (190° C./2.16 kg) of 8 g/10 min, calculated according to the standard ASTM D1238-ISO1133.

This polymer is commercially available under the name Elvaloy® 4170P from DuPont and exhibits:
  a number-average molecular weight (Mn), measured by triple detection gel permeation chromatography, equal to 16 220 g·mol$^{-1}$,
  a weight-average molecular weight (Mw), measured by triple detection gel permeation chromatography, equal to 56 890 g·mol$^{-1}$,
  a polydispersity index, determined by triple detection gel permeation chromatography, equal to 3.5,
  a mean number of ethylene units per macromolecule equal to 406,
  a mean number of butyl acrylate units per macromolecule equal to 27,
  a mean number of glycidyl methacrylate units per macromolecule equal to 10,
  a mean weight of ethylene units equal to 11 354 g per mole of polymer,
  a mean weight of butyl acrylate units equal to 3406 g per mole of polymer, and
  a mean weight of glycidyl methacrylate units equal to 1460 g per mole of polymer.

Adjuvant A2: Ethylene/ethyl acrylate/glycidyl methacrylate terpolymer in proportions by weight respectively of 74/20/6 and having a melt flow rate (MFR) (190° C./2.16 kg) of 12 g/10 min, calculated according to the standard ASTM D1238-ISO1133.

This polymer is commercially available under the name Elvaloy® 5160 from DuPont and exhibits:
  a number-average molecular weight (Mn), measured by triple detection gel permeation chromatography, equal to 48 720 g·mol$^{-1}$,
  a weight-average molecular weight (Mw), measured by triple detection gel permeation chromatography, equal to 79 390 g·mol$^{-1}$,
  a polydispersity index, determined by triple detection gel permeation chromatography, equal to 1.6,
  a mean number of ethylene units per macromolecule equal to 1288,
  a mean number of ethyl acrylate units per macromolecule equal to 97,
  a mean number of glycidyl methacrylate units per macromolecule equal to 21,
  a mean weight of ethylene units equal to 36 053 g per mole of polymer,
  a mean weight of butyl acrylate units equal to 9744 g per mole of polymer, and
  a mean weight of glycidyl methacrylate units equal to 2923 g per mole of polymer.

Adjuvant A3:

Ethylene/ethyl acrylate/glycidyl methacrylate terpolymer in proportions by weight respectively of 74/16/10 and having a melt flow rate (MFR) (190° C./2.16 kg) of 8 g/10 min, calculated according to the standard ASTM D1238-ISO1133.

This polymer is commercially available under the name Elvaloy® 5170 from DuPont and exhibits:
  a number-average molecular weight (Mn), measured by triple detection gel permeation chromatography, equal to 116 700 g·mol$^{-1}$,
  a weight-average molecular weight (Mw), measured by triple detection gel permeation chromatography, equal to 166 900 g·mol$^{-1}$,
  a polydispersity index, determined by triple detection gel permeation chromatography, equal to 1.4,
  a mean number of ethylene units per macromolecule equal to 3084,
  a mean number of ethyl acrylate units per macromolecule equal to 187,
  a mean number of glycidyl methacrylate units per macromolecule equal to 82,
  a mean weight of ethylene units equal to 86 358 g per mole of polymer,
  a mean weight of butyl acrylate units equal to 18 672 g per mole of polymer, and
  a mean weight of glycidyl methacrylate units equal to 11 670 g per mole of polymer.

The Elastomers

Elastomer E1: mixture based on block copolymer S-B1-B2 also comprising copolymer (S-B1-B2)$_n$X in which S represents a monovinylaromatic hydrocarbon block having a peak molecular weight of 10 000 to 25 000, B1 is a polybutadiene block having a vinyl content of less than or equal to 15 mol percent and B2 is a polybutadiene block having a vinyl content of greater than or equal to 25 mol percent, the B1/B2 ratio being greater than or equal to 1:1, the block copolymer S-B1-B2 has a peak molecular weight from 40 000 to 200 000, n is an integer ranging from 2 to 6, X is the residue of a coupling agent, the block copolymer (S-B1-B2)$_n$X has a peak molecular weight which is from 1.5 to 6.0 times the peak molecular weight of the block copolymer S-B1-B2, in which the S-B1-B2/(S-B1-B2)$_n$X ratio by weight is greater than or equal to 1:1. The content of vinyl groups in the mixture is 24.1 mol %, with respect to the total number of moles of polymers. The content of monovinylaromatic hydrocarbon monomers is 15.8 mol %, with respect to the total number of moles of polymers. The weight-average molecular weight of the mixture is 285 000 g·mol$^{-1}$. This elastomer is available from Kraton under the name MD246.

Elastomer E2: styrene/butadiene/styrene (SBS) block copolymer, having 18.8 mol % of styrene and having 81.2 mol % of butadiene, with respect to the total number of moles of copolymer. The content of vinyl groups is 29.4 mol %, with respect to the total number of moles of copolymer.

The copolymer has a weight-average molecular weight (Mw) of 131 000 g·mol$^{-1}$. This copolymer is commercially available from Kraton under the name D1192.

B—Bitumen/polymer Compositions in Concentrated Form

1) Preparation of Concentrated Compositions

The concentrated compositions $C_1$ to $C_5$ corresponding to the mixtures described in detail in table 1 below were prepared according to the following protocol:
Mixing at 195° C. of:
4.0% by weight of an elastomer;
0.5% by weight of an olefinic polymer adjuvant; and
95.5% by weight of a bitumen base,
Introduction of the mixture into a reactor equipped with a Silverson® mixer and stirring of the mixture (6000 revolutions/min) for 3 hours at a temperature of 195° C. in order to obtain a homogeneous mixture, and
Mechanical stirring of the mixture for 2 h: at 400 revolutions/min at 195° C.

The compounds used for the preparation of the concentrated compositions $C_1$ to $C_5$ are given in the following table 1. The concentrated compositions $C_1$ to $C_3$ are comparative and the concentrated compositions $C_4$ and $C_5$ are according to the invention.

TABLE 1

| Concentrated compositions $C_1$ to $C_5$ | | | | | |
|---|---|---|---|---|---|
| Composition | $C_1$ | $C_2$ | $C_3$ | $C_4$ | $C_5$ |
| Bitumen base | B | B | B | B | B |
| Elastomer | E1 | E1 | E1 | E2 | E2 |
| Adjuvant | A1 | A2 | A3 | A2 | A3 |

2) Storage Stability of the Concentrated Compositions

The storage stability of the concentrated compositions $C_1$ to $C_5$ prepared above is evaluated by measuring the difference in penetrability (ΔPene) and the difference in RBSP (ΔRBSP) of each composition after 3 days of storage at 180° C.

The results obtained are given in the following table 2.

TABLE 2

| Storage stability of the concentrated compositions $C_1$ to $C_5$ | | | | | |
|---|---|---|---|---|---|
| Composition | $C_1$ | $C_2$ | $C_3$ | $C_4$ | $C_5$ |
| Δ Penetrability (dmm) | 0 | 0 | 0 | 0 | 0 |
| Δ RBSP (° C.) | 0.2 | 0.8 | 0.4 | 0.4 | 0.4 |

The values of the penetrability and of the ring and ball softening point of the concentrated compositions $C_1$ to $C_5$ change very little even after storage for 3 days at 180° C.: these compositions are thus stable on storage.

C—Bitumen/polymer Compositions in Diluted Form

1) Preparation of the Dilute Compositions

The concentrated compositions $C_1$ to $C_5$ obtained in B-1) are diluted to 80% by weight in the bitumen base B brought beforehand to a temperature of 180° C. The dilute mixture is then introduced into a reactor in which it is subjected to mechanical stirring of 400 revolutions/min at 180° C. for 1 hour.

The resulting dilute compositions $C_1'$ to $C_5'$ are respectively obtained from the concentrated compositions $C_1$ to $C_5$.

The dilute compositions $C_1'$ to $C_5'$ obtained comprise:
3.2% by weight of elastomer,
0.4% by weight of olefinic polymer adjuvant, and
96.4% by weight of bitumen.

The dilute compositions $C_1'$ to $C_3'$ are comparative and the dilute compositions $C_4'$ and $C_5'$ are according to the invention.

2) Mechanical Properties of the Dilute Compositions

The mechanical properties of the dilute compositions $C_1'$ to $C_5'$ are evaluated according to the methods explained above. The results are reported in the following table 3:

TABLE 3

| Mechanical properties of the dilute compositions $C_1'$ to $C_5'$ | | | | | |
|---|---|---|---|---|---|
| Composition | $C_1'$ | $C_2'$ | $C_3'$ | $C_4'$ | $C_5'$ |
| Penetrability (dmm) | 35 | 36 | 36 | 34 | 34 |
| RBSP (° C.) | 63.2 | 62.6 | 62.4 | 63.4 | 63 |
| Elastic recovery (%) | 80 | 80 | 80 | 80 | 79 |
| Tensile tests at 5° C. | | | | | |
| Energy at 400% (J/cm$^2$) | 19.05 | 19.43 | 18.29 | 23.19 | 23.25 |
| Total energy (J) | 3.71 | 3.98 | 3.64 | 4.93 | 5.02 |
| ε max (%) | >600 | >600 | >600 | >600 | >600 |
| σ ε max (MPa) | 1.05 | 1.05 | 0.92 | 1.39 | 1.4 |

It is observed that the nature of the elastomer and of the olefinic polymer adjuvant has virtually no influence on the values of the penetrability, of the ring and ball softening point and of the elastic recovery of the bitumen/polymer compositions obtained.

As regards the tensile tests at 5° C., it is observed that the compositions $C_4'$ and $C_5'$ exhibit, in comparison with the compositions $C_1'$ to $C_3'$:
a higher energy at 400%,
a total energy which is also higher, and
a greater value of stress at maximum strain.

The compositions $C_4'$ and $C_5'$ thus exhibit improved mechanical properties in comparison with the compositions $C_1'$ to $C_3'$.

It is also observed that, with one and the same olefinic polymer adjuvant, the compositions based on the elastomer E2 exhibit improved mechanical properties in comparison with the compositions based on the elastomer E1:
the composition $C_4'$ exhibits an energy at 400%, a total energy and a value of stress at maximum strain which are higher in comparison with the composition $C_2'$, and
the composition $C_5'$ exhibits an energy at 400%, a total energy and a value of stress at maximum strain which are higher in comparison with the composition $C_3'$.

The compositions based on the elastomer E2 thus exhibit improved mechanical properties in comparison with the bitumen/polymer compositions prepared from the elastomer E1.

The invention claimed is:
1. A bitumen/polymer composition comprising:
bitumen,
at least one elastomer, and
at least one olefinic polymer adjuvant functionalized by at least one epoxy group,
wherein the elastomer is a heat-crosslinkable block copolymer of formula S-B-S, in which each S independently represents a block based on monovinylaromatic hydrocarbon monomers and B repre- sents a block based on butadiene monomers, in which the S blocks represent, together, at least 15 mol % of the total number of moles of the heat-crosslinkable block copolymer, said heat-crosslinkable block copolymer has a weight-average molecular weight ranging from 40 000 to 500 000 g·mol$^{-1}$ and exhibits a content of vinyl groups of greater than or equal to 20 mol %, with respect to the total number of moles of the heat-crosslinkable block copolymer,
   wherein the olefinic polymer adjuvant functionalized by at least one epoxy group is chosen from random terpolymers of ethylene, of a monomer A chosen from $C_1$ to $C_3$ alkyl acrylates or methacrylates and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene, and
   wherein the bitumen/polymer composition comprises less than 6 ppm of sulfur-containing crosslinking agent.

2. The composition as claimed in claim 1, in which each S represents a polystyrene block.

3. The composition as claimed in claim 1, in which the heat-crosslinkable block copolymer exhibits a content of vinyl groups of greater than or equal to 25 mol %, with respect to the total number of moles of the heat-crosslinkable block copolymer.

4. The composition as claimed in claim 1, in which the S blocks of the heat-crosslinkable block copolymer represent, together, from 15 mol % to 50 mol % of the total number of moles of the heat-crosslinkable block copolymer.

5. The composition as claimed in claim 1, which comprises from 0.5% to 20% by weight of elastomer, with respect to the total weight of the composition.

6. The composition as claimed in claim 1, which comprises from 0.05% to 2.5% by weight of olefinic polymer adjuvant functionalized by at least one epoxy group, with respect to the total weight of the composition.

7. The composition as claimed in claim 1, in which the olefinic polymer adjuvant functionalized by at least one epoxy group is chosen from random terpolymers of ethylene, of a monomer A chosen from ethyl acrylate or ethyl methacrylate and of a monomer B chosen from glycidyl acrylate and glycidyl methacrylate, comprising from 0.5% to 40% by weight of motifs resulting from the monomer A and from 0.5% to 15% by weight of motifs resulting from the monomer B, the remainder being formed of motifs resulting from ethylene.

8. The composition as claimed in claim 1, in which the number-average molecular weight (Mn) of the olefinic polymer adjuvant functionalized by at least one epoxy group, ranges from 5000 to 50 000 g·mol$^{-1}$.

9. The composition as claimed in claim 1, in which the polydispersity index of the olefinic polymer adjuvant functionalized by at least one glycidyl group is less than or equal to 3.

10. The composition as claimed in claim 1, in which the olefinic polymer adjuvant functionalized by at least one epoxy group comprises, on average, at least 500 ethylene units per macromolecule.

11. The composition as claimed in claim 1, in which the average mass of the ethylene units present in one mole of olefinic polymer adjuvant functionalized by at least one epoxy group is greater than or equal to 15 000 g.

12. The composition as claimed in claim 1, in which the olefinic polymer adjuvant functionalized by at least one epoxy group comprises, on average, at least 30 alkyl (meth)acrylate units per macromolecule.

13. The composition as claimed in claim 1, in which the average mass of the alkyl (meth)acrylate units present in one mole of olefinic polymer adjuvant functionalized by at least one epoxy group is greater than or equal to 3500 g.

14. A method for the preparation of a heat-crosslinked bitumen/polymer composition from a composition as claimed in claim 1, wherein the following are brought into contact, the operation being carried out at temperatures ranging from 100° C. to 200° C.:
   bitumen,
   from 0.5% to 20% by weight of at least one elastomer,
   from 0.05% to 2.5% by weight of at least one olefinic polymer adjuvant functionalized by at least one epoxy group, and
   optionally additives.

15. The method as claimed in claim 14, in which the operation is carried out at a temperature ranging from 160° C. to 195° C.

16. A heat-crosslinked bitumen/polymer composition obtained by the method as claimed in claim 14.

17. The bitumen/polymer composition as claimed in claim 16 which further comprises inorganic and/or synthetic fillers and which is an asphalt.

18. The bitumen/polymer composition as claimed in claim 16 which further comprises aggregates and optionally inorganic and/or synthetic fillers and which is a bituminous mix.

* * * * *